3,561,885
BLOWER HOUSING
Charles R. Lake, Brecksville, Ohio, assignor to Pyronics, Inc., Cleveland, Ohio
Filed Aug. 11, 1969, Ser. No. 849,116
Int. Cl. F01d 25/24; F04d 17/08, 29/40
U.S. Cl. 415—219
5 Claims

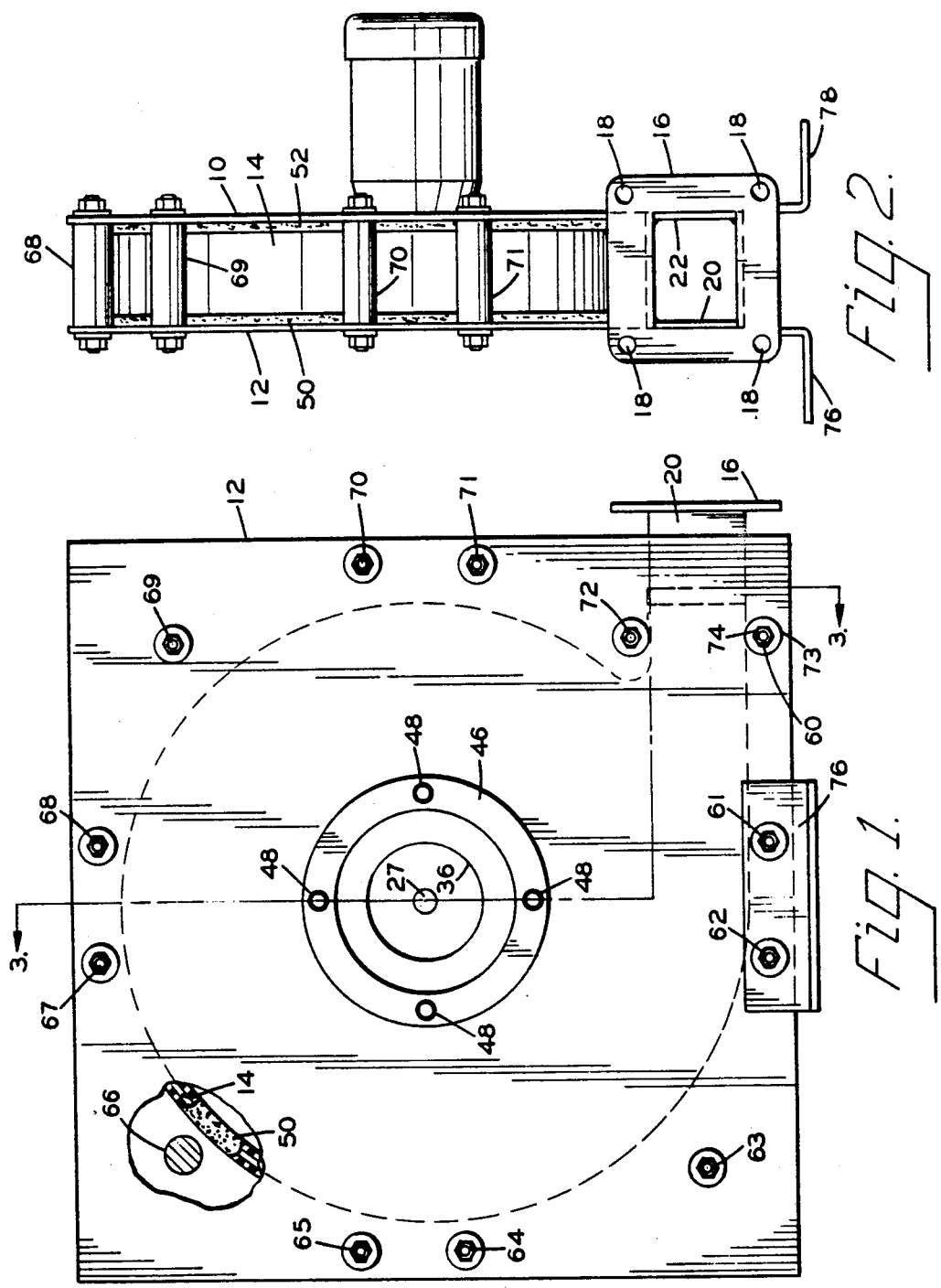
Feb. 9, 1971     C. R. LAKE     3,561,885
BLOWER HOUSING
Filed Aug. 11, 1969     2 Sheets-Sheet 1
INVENTOR.
CHARLES R. LAKE
BY
Meyer, Tilberry & Body
ATTORNEYS.

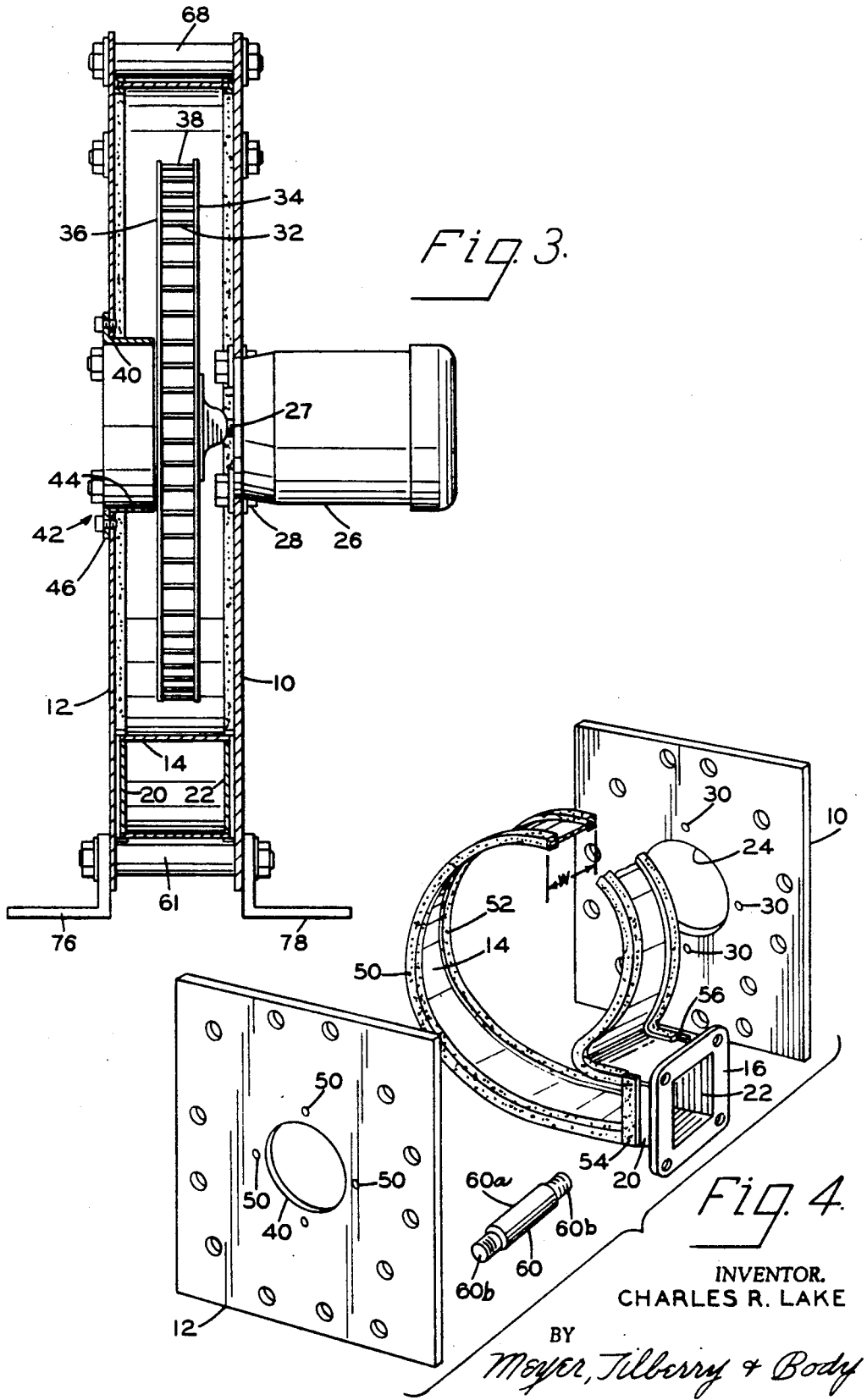

ABSTRACT OF THE DISCLOSURE

A radial flow blower housing comprising flat, rectangular side plates positioned on opposite sides of a scroll forming member. The scroll forming member is made from an elongated strip of metal curved into the required shape. The side plates are clamped to the scroll forming member by transversely extending bolts or studs which are arranged to position the scroll forming member. Additionally, the edges of the scroll forming member are provided with resilient, U-shaped gaskets which engage the side plates to form an airtight seal.

---

The present invention is directed toward the fan art and, more particularly to an improved radial-flow type blower.

Typical radial flow blowers include a scroll-type housing in which is mounted a rotary impeller. The housings have generally been of welded construction and comprised a scroll member positioned between opposed side plates cut to the shape of the scroll member. Continuous welds were formed along the junctures between the scroll member and the side plates.

As can be appreciated, both the scroll member and the side plates had to be formed relatively precisely to assure proper mating. Additionally, during the welding operation they had to be positioned and held in exactly the proper relationship. The relationship was difficult to maintain during the welding operation. This was because uneven heating of the parts as the welding proceeded produced thermal deformation. This coupled with any original variations in the parts made the welding operation difficult and time consuming.

Many attempts have been made to simplify the design of the housings, and reduce, or eliminate entirely, the welding required. In general, these attempts have been unsatisfactory. For example, attempts have been to use specially arranged angle brackets and flanges between the scroll member and the side plates. These arrangements required somewhat precise forming and resulted in housings which were difficult and time consuming to assemble. Other designs proposed included forming recesses or grooves in the side plates. The scroll member was fitted into the recesses and bolted or clamped therein. These designs, like the other, were somewhat difficult to form and assemble.

The present invention overcomes the above-discussed problems and provides a blower housing which is extremely simple to construct. Blowers formed in accordance with the invention can be assembled and disassembled rapidly without the use of special forming or assembly techniques. Further, although housings constructed in accordance with the invention are simple, they are extremely rugged and reliable.

In accordance with the invention there is provided a blower including a scroll member formed from an elongated, generally rectangular, strip of metal. Generally planar side plate members are positioned on opposite sides of the scroll member to define a closed blower housing. The side plate members are connected to the scroll member by a plurality of bolts or studs which pass through aligned openings in the plate members and clamp the side plates to the scroll. The openings are located so that at least some of the bolts closely engage the outer surface of the scroll member to position it properly relative to the plate members. Additionally, resilient seal strips are mounted on opposite edges of the scroll member for engaging the side plate members and providing an airtight seal.

In accordance with a more limited aspect of the invention, the side plates are flat rectangular metal plates and the resilient seal strips are clipped on the opposite edges of the scroll member.

As can be appreciated, the entire blower housing can be constructed without any difficult forming or welding operations. The scroll member is both positioned and clamped by the bolts, and the side plates can be simple, flat rectangular plates. Because of the positioning accomplished by the bolts there is no need for special grooves, flanges, etc. Further, the resilient seal strip eliminates the requirement of smoothly machined mating surfaces between the scroll and the side plates.

Accordingly, a primary object of the invention is the provision of a blower housing which is extremely simple and inexpensive to construct.

Another object is the provision of a blower housing which can be formed without the need for extensive welding.

A further object is the provision of a blower housing of the type which can be manufactured from metal plate without using special forming techniques.

These and other objects and advantages will become apparent from the following description when read in conjunction with the accompanying drawings wherein:

FIG. 1 is a side elevation of a blower formed in accordance with the present invention;

FIG. 2 is a right-end elevation of the blower of FIG. 1 showing the air discharged outlet;

FIG. 3 is a cross-sectional view taken on line 3—3 of FIG. 1; and,

FIG. 4 is an exploded pictorial view showing the major structural elements of the blower housing.

Referring now more particular to FIGS. 1–4 of the drawings, it will be noted that the blower housing broadly comprises a pair of side plates 10 and 12 joined to a central scroll forming section form member 14. The side plates 10 and 12, as well as the scroll forming member 14, are preferably formed from relatively heavy gauge metal plate or sheet. Although the side plates 10 and 12 could be of a variety of configurations, they preferably comprise simple rectangular, metal plates flat and devoid of grooves, flanges, etc.

The scroll section 14 is preferably merely an elongated flat strip of metal plate which is coiled into the usual scroll shape. An outlet forming flange member 16 is welded to the ends of the strip which forms the scroll member 14. As shown, the flange 16 is provided with bolt holes 18 so as to provide means for readily connecting it to an associated air receiving duct or other means to which air is being supplied. Referring to FIGS. 2 and 4, it will be noted that at the outlet end of the scroll there are also provided two small side plates 20 and 22 which are welded to the flange 16 and the sides of the scroll forming member 14. These members 20, 22 enclose the outlet end of the scroll to provide a rectangular outlet section.

Referring particular to FIGS. 2–4, it will be noted that the side plate 10 has an enlarged opening 24 formed centrally thereof. The opening 24 provides an access opening for mounting the electric drive motor 26. In the embodiment under consideration, no additional mounting supports or flanges are needed and the motor 26 is directly connected to the side plate 10 by a plurality of bolts 28. The bolts 28 pass through the openings 30 formed circumferentially of the central opening 24.

A conventional blower wheel 32 is mounted within the housing and on the inner end of the motor drive shaft 27. The blower wheel 32 forms no part of the present invention and could be of a variety of construction. In the subject embodiment, the blower wheel 32 merely comprises a pair of spaced, side plates 34 and 36 having a multiplicity of radially extending blades positioned therebetween. The blades 32 are connected to the side plates in any convenient manner such as by welding or riveting. The side plate 36, is additionally provided with a large diameter center opening which severs as the air intake opening. Additionally, the radially extending blades 32 terminates slightly short of the center section.

The side plate 12 is provided with a large diameter opening 40 generally centrally thereof. As can be seen from FIGS. 1 and 3, the opening 40 serves as the air inlet opening for the blower housing. Preferably, a tubular sleeve member 42 is positioned in the opening 40 to serve as an inlet to direct the air to the center of the blower wheel. The sleeve member 42 comprises a short section of thin walled pipes 44 having an annular flange 46 welded to its periphery. The flange 46 is releasably connected to the side plate 12 by four machine screws 48 which pass through the flange and are received in tapped openings 50 formed in the side plate 12.

As discussed early, prior to the subject invention the usual blower housing comprised a scroll section and two side plates cut to conform generally to shape of the scroll section and welded thereto. This caused substantial fabricating and manufacturing problems since the scroll section tended to warp and twist during welding necessitating special clamping and holding mechanism. Additionally, the extensive welds required consumed substantial manufacturing time. The subject invention overcomes these problems by a special interrelationship between the side plates, the scroll section, and the innerconnecting means. Referring more particular to FIGS. 1 and 4, it will be seen that there are no special mating grooves, flanges or any similar type structure formed on either of the side plates 10 or 12. Rather, according to the subject invention the side plates 10 and 12 are preferably flat smooth plates and the scroll section 14 merely engaged therewith and clamped between the side plates. More particularly, the outer peripheral edges of the scroll member 14 are provided with resilient sealing gaskets which extend throughout the length of all of the meeting portions of the edges. As shown in FIGS. 1 and 4, the scroll section 14 is preferably provided with a generally C-shaped resilient gasket 52. The gasket 50 is received on, resiliently engages, the outer edges of the scroll section 14. As is apparent, the gasket 50 could have a variety of cross-sectional configurations but is shown as being of generally C-shape. This is preferred since it facilitates gasket positioning during assembly. As shown, one of the gaskets 50 extends completely about both sides of the member 14. At the endlet end of the blower housing, flat resilient gaskets 54, 56 extend vertically and between the ends of the gaskets 50, 52. The gasket strips 54, 56 are preferably connected to the sides 20, 22 by an adhesive. Alternately, the gasket strips 54, 56 could be C-shaped gasket strips such as 50, 52 cut so as to permit a small end portion to extend up beyond the ends of the gaskets 50, 52.

By the use of the aforementioned gaskets, the outer edges of the scroll forming member 14 can be merely rough sheared and do not have to have any special machining or treating. Additionally, when the side plates 10 and 12 are firmly clamped to the scroll section 14 an air tight seal results. Thus, the need for special welding is completely eliminated.

According to an additional feature of the subject invention, the means which clamp the side plates 10, 12 to the scroll member 14 are arranged so that they function during the assembly operation to position the scroll member. This could be accomplished in many ways; however, according to the preferred embodiment of the invention the clamping means comprise a plurality of stud or bolt members 60–72. The particular number of the studs used could vary widely depending upon the size of the blower provided. Additionally, the actual type of studs provided could also be varied. In the embodiment shown, the studs 60–72 are identical and, as shown in FIG. 4, each stud includes an enlarged diameter center section 60a and somewhat smaller diameter threaded end sections 60b. The center section 60a is of a length less than the overall width W of the scroll section 14 with the gasket strips 50, 52 in position. Consequently, when the washers 73 and the nuts 74 are attached to the outer ends 60b of the studs and tightened the side plates 10 and 12 can be brought snugly into engagement with the gaskets 50, 52.

Although the locations for the studs 60–62 could vary widely, according to the subject invention at least some of the studs are positioned so that their enlarged center sections will engage the outer peripheral surfaces of the gaskets 50, 52 or the scroll section 14. Referring to FIG. 1 for example, the studs 60 and 72, as well as the paired studs 61, 62; 64, 65; 67, 68; and 70, 71, are arranged so as to engage the outer periphery of the preferred scroll shape. Thus, during assembly, the studs precisely locate the scroll section and maintain it in position until they have been securely tightened. Consequently, the scroll section is always properly oriented relative to the side plates 10 and 12.

As previously mentioned, the number of studs provided can vary substantially. In the embodiment under consideration, additional studs 63, 66 and 69 are provided to assure sufficient clamping force.

An additional feature of the subject invention is the mounting arrangement. As best seen in FIGS. 1–3, the housing is provided with a pair of angle brackets 76, 78. These angle brackets serve as the mounting or base member for the unit. As is shown, the angle brackets are connected to the units by the previously mentioned studs 61, 62. Note that the studs 61, 62 have their outer threaded end portions passing through openings formed in the plates 76, 78. Thus, the plates are firmly clamped to the side plates 10 and 12. Referring in particular to FIG. 1, it will be noted that the stud pairs 64, 65; 67, 68; and 70, 71, are also positioned at spaced locations corresponding to the spacing between the studs 61, 62. This arrangement permits the angle plates 76, 78 to be mounted on any desired side of the assembly. Merely by releasing the nuts on the studs 61, 62 the mounting plates can be moved and shifted to another location. Thus, the blower can be mounted in any desired orientation. This is a substantial advantage when compared to prior blower units which are generally restricted to a single mounting position.

As can be appreciated from the aforegoing description, the subject invention permits a rigid and efficient blower housing to be manufactured from flat metal plates without the use of any special forming or assembly techniques. Additionally simple to assemble and maintain.

Having thus described my invention, I claim:

1. A radial flow blower including: a scroll member comprising an elongated, flat metal strip curved in a desired scroll shape; a pair of planar side plate members positioned on opposite sides of said scroll member to define a closed blower housing; a plurality of bolt members extending between said side plate members to clamp them to said scroll member; resilient gaskets between said scroll member and said side plate members; and, at least some of said bolt members being positioned to locate said scroll member relative to said side plate members.

2. The blower as defined in claim 1 wherein said side plate members are generally rectangular and said gaskets are attached to said scroll member.

3. The blower as defined in claim 2 including mounting flange members connected to said side plates by some of said bolt members.

4. The blower as defined in claim 2 including a blower wheel positioned in said housing and a motor drivingly connected to said wheel as carried from one of said side plates.

5. The blower as defined in claim 1 wherein said bolt members extend through aligned openings in said side plate members; said openings being arranged so that said bolt members are on the outside of said scroll member.

References Cited

UNITED STATES PATENTS

| | | | |
|---|---|---|---|
| 1,584,944 | 5/1926 | Johnson | 415—219 |
| 1,791,170 | 2/1931 | Schuchardt | 230—127X |
| 1,895,488 | 1/1933 | Reisinger | 230—127X |
| 2,798,659 | 7/1957 | Tweedy | 230—133(C)X |

LEONARD H. GERIN, Primary Examiner